(12) United States Patent
Dittmar et al.

(10) Patent No.: US 8,533,584 B2
(45) Date of Patent: Sep. 10, 2013

(54) CONTEXT CONTROL

(75) Inventors: Kerstin Dittmar, Stuttgart (DE);
Carsten Fuchs, Wiesloch (DE);
Bernhard Teltscher, Speyer (DE); Ingo Deck, Mannheim (DE); Susann Stieler, Heidelberg (DE); Martin Schrepp, Hockenheim (DE); Annett Hardt, Mannheim (DE); Theo Held, Wiesloch (DE); Dietrich Mayer-Ullmann, Ilvvesheim (DE); Nadine Beigel, Bobenheim-Roxheim (DE); Hena Mau, Walldorf (DE); Martin Wegmann, Worms (DE); Stefan Kirchfeld, Walldorf (DE); Edward Palmer, Westmount (CA)

(73) Assignee: SAP AG, Walldorf (DE)

( * ) Notice: Subject to any disclaimer, the term of this patent is extended or adjusted under 35 U.S.C. 154(b) by 1160 days.

(21) Appl. No.: 12/023,586

(22) Filed: Jan. 31, 2008

(65) Prior Publication Data
US 2009/0158135 A1    Jun. 18, 2009

Related U.S. Application Data

(60) Provisional application No. 61/013,896, filed on Dec. 14, 2007.

(51) Int. Cl.
*G06F 17/00* (2006.01)
(52) U.S. Cl.
USPC ............ 715/225; 715/226; 715/201; 715/792
(58) Field of Classification Search
USPC .......... 715/201, 225, 226, 708, 792; 719/316
See application file for complete search history.

(56) References Cited

U.S. PATENT DOCUMENTS

| | | | |
|---|---|---|---|
| 5,432,925 A | 7/1995 | Abraham et al. | |
| 5,956,024 A * | 9/1999 | Strickland et al. | 715/717 |
| 6,701,311 B2 | 3/2004 | Biebesheimer et al. | |
| 6,769,095 B1 | 7/2004 | Brassard et al. | |
| 6,778,193 B2 | 8/2004 | Biebesheimer et al. | |
| 6,785,676 B2 | 8/2004 | Oblinger | |
| 6,853,998 B2 | 2/2005 | Biebesheimer et al. | |
| 6,871,183 B2 * | 3/2005 | Gilday et al. | 705/14.41 |
| 6,934,740 B1 * | 8/2005 | Lawande et al. | 709/213 |
| 6,986,145 B2 * | 1/2006 | Gangopadhyay | 719/316 |

(Continued)

OTHER PUBLICATIONS

"SAP for Consumer Products SAP Trade Promotion Management" SAP White Paper (2003).

*Primary Examiner* — Cesar Paula
*Assistant Examiner* — Howard Cortes
(74) *Attorney, Agent, or Firm* — Brake Hughes Bellermann LLP

(57) ABSTRACT

A context control interface may include a context name field that is arranged and configured to identify a working context, one or more attribute name fields that are configured to identify one or more attributes that define the working context and one or more attribute value fields that are arranged and configured to correspond to the attribute name fields and to define one or more values for the attribute name fields. The attribute name fields and the corresponding attribute value fields may be mapped to a first set of fields in a first application and may be mapped to second set of fields in a second application and the attributes and the values populate the first set of fields and the second set of fields such that the working context is persistent across the first application and the second application, where the first application differs from the second application.

16 Claims, 7 Drawing Sheets

(56) References Cited

U.S. PATENT DOCUMENTS

| | | |
|---|---|---|
| 7,092,958 B2 | 8/2006 | Hempstead et al. |
| 7,330,192 B2* | 2/2008 | Brunner et al. ............... 345/592 |
| 7,539,747 B2* | 5/2009 | Lucovsky et al. ............. 709/224 |
| 7,574,657 B2* | 8/2009 | Chand .......................... 715/734 |
| 7,721,193 B2* | 5/2010 | Upton ........................... 715/234 |
| 7,774,300 B2* | 8/2010 | Hsiao et al. ................... 707/602 |
| 2004/0260715 A1* | 12/2004 | Mongeon et al. ............. 707/101 |
| 2005/0256825 A1* | 11/2005 | Dettinger et al. ................. 707/1 |
| 2005/0278211 A1* | 12/2005 | Adams ........................... 705/10 |
| 2005/0278261 A1* | 12/2005 | Omanson et al. ............... 705/77 |
| 2005/0278630 A1* | 12/2005 | Bracey .......................... 715/704 |
| 2005/0278655 A1* | 12/2005 | Sims ............................. 715/792 |
| 2006/0212299 A1* | 9/2006 | Law ................................. 705/1 |
| 2006/0236328 A1* | 10/2006 | DeWitt ......................... 719/329 |
| 2007/0089066 A1* | 4/2007 | Chaudhri et al. ............. 715/768 |
| 2007/0226032 A1* | 9/2007 | White et al. ...................... 705/9 |
| 2007/0266054 A1* | 11/2007 | Stephens et al. ............. 707/200 |
| 2008/0219429 A1* | 9/2008 | Mandalia et al. ........ 379/266.02 |
| 2009/0158135 A1* | 6/2009 | Dittmar et al. ................ 715/226 |

\* cited by examiner

CONTEXT CONTROL

CROSS REFERENCE TO RELATED APPLICATIONS

This application claims the benefit of U.S. Provisional Application No. 61/013,896, filed Dec. 14, 2007, and titled "Context Control", which is hereby incorporated by reference in its entirety.

TECHNICAL FIELD

This description relates to context control.

BACKGROUND

In enterprise systems, a user may be able to create and maintain many business objects across various applications, where the business objects may be linked with each other. In creating these linked business objects, the user may need to repeatedly input some of the same information within a business application and input some of the same information across multiple, separate applications. When the user has many business objects that need to be created and maintained, the process of creating the business objects may be a very time consuming and inefficient task.

Also, the user may only supposed to be working within a defined criteria when creating and maintaining the business objects. For example, the user's job requirements may dictate that the user should only be working on particular accounts or with particular customers. In large enterprise systems with many accounts, customers and possible variations, it may be difficult for the user to remain focused on his/her particular job responsibilities.

Consequently, it may be difficult or impossible for a user to create and manage the business objects in an optimal manner. For example, the user may mistakenly include incorrect parameters or attributes when creating business objects and when switching between multiple different applications within the enterprise system. As a result, the success of the user and of the underlying enterprise may suffer.

SUMMARY

Various implementations of a context control system with a context control interface are disclosed. According to one general aspect, a computer program product for handling context control information is disclosed. The computer program product is tangibly embodied on a computer-readable medium and includes executable code that, when executed, is configured to cause at least one data processing apparatus to provide a context control interface. The context control interface may include a context name field that is arranged and configured to identify a working context, one or more attribute name fields that are configured to identify one or more attributes that define the working context, and one or more attribute value fields that are arranged and configured to correspond to the attribute name fields and to define one or more values for the attribute name fields. The attribute name fields and the corresponding attribute value fields may be mapped to a first set of fields in a first application and may be mapped to second set of fields in a second application and the attributes and the values populate the first set of fields and the second set of fields such that the working context is persistent across the first application and the second application, where the first application differs from the second application.

According to another general aspect, a customer relationship management system includes a customer relationship manager server configured to provide a context control system for use by a user is disclosed. The context control system may include an attribute name manager that is arranged and configured to access attribute name information and to populate one or more attribute name fields with the attribute name information in a context control interface, an attribute value manager that is arranged and configured to access attribute value information and to populate one or more attribute value fields with the attribute value information in the context control interface, a view generator that is arranged and configured to display the context control interface, and a mapping manager that is arranged and configured to map the attribute name fields and the attribute value fields to a first set of fields in a first application and to a second set of fields in a second application, where the first application differs from the second application.

According to another general aspect, a customer relationship management system includes a customer relationship manager server configured to provide a context control system for use by a user. The context control system may include an attribute name manager that is arranged and configured to receive attribute name information from a first application and to populate one or more attribute name fields with the attribute name information in a context control interface, an attribute value manager that is arranged and configured to receive attribute value information from the first application and to populate one or more attribute value fields with the attribute value information in the context control interface, a view generator that is arranged and configured to display the context control interface, and a mapping manager that is arranged and configured to map the attribute name fields and the attribute value fields to a set of fields in a second application and to populate the set of fields with the attribute name information and the attribute value information, where the first application differs from the second application The details of one or more implementations are set forth in the accompanying drawings and the description below. Other features will be apparent from the description and drawings, and from the claims.

DETAILED DESCRIPTION

Figure 1:
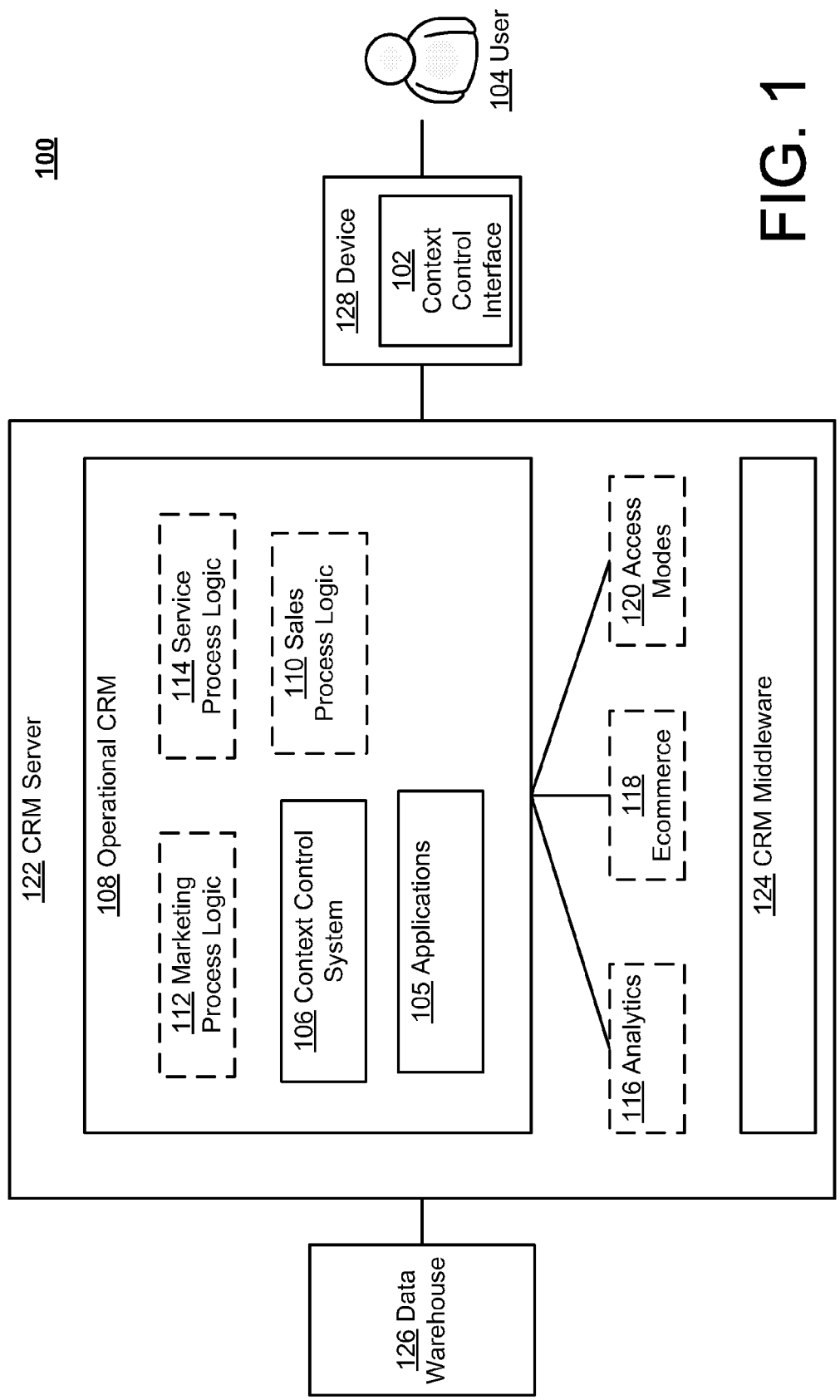
FIG. 1 is a block diagram of an example system for a context control system with context control interface of a customer relationship management (CRM) system.

FIG. 1 is an exemplary block diagram of an example system 100 for a context control system of a customer relationship management (CRM) system. In the example of FIG. 1, the system 100 allows a user of the system to control the work environment such that the user works within the same working context across various different applications. The system 100 allows the user to control the work environment through a context control interface 102 of the CRM system. For example, the user may set attributes and attribute values in the context control interface 102 that may serve as default values in each of the different applications that may be utilized. The user may define a particular group of attributes and attribute values and save the defined group for later use. The context control interface 102 makes it easy for the user to define and save multiple different working contexts and makes it easy for the user to switch between the different working contexts. The user may find the context control interface 102 useful when working within the same working context as the user switches between applications. Once the information is in the context control interface 102, the same information is applied to the different applications without the user having to manually enter the same information in each application. Consequently, the user may save time and realize greater efficiency and accuracy by using the context control system and interface.

The context control interface 102 may act as a filter to filter the information that is being displayed to a user. For example, only information that matches the attributes and/or attribute values may be displayed to the user. This filtering feature enables the user to focus on the particular context at hand. The filtering feature works across multiple applications. Thus, once the attributes and values are set in the context control interface 102, the information displayed to the user will be in the context of those set attributes and values because only information that matches the set attributes and values will be eligible for display. Any other information may be filtered out from the view or from manipulation by the user due to the current context criteria.

Additionally, the system 100 may include customizing features that allow the context control system and the context control interface 102 to be configured for a particular user. For example, the context control system and the context control interface 102 may be configured for a particular user based on their job responsibilities, their job function, and/or their access level. For instance, a supervisor may need unlimited access such that their access within the context control system and the context control interface is not restricted. On the other hand, a more junior person may only need to work with a particular set of information, such that their access within the context control system and the context control interface may be more restricted or constrained than that of the supervisor.

Thus, the context control system and the context control interface 102 may allow the user to quickly and efficiently manage the different working contexts across multiple different applications, where the information and business objects across the various applications may be linked and/or related. For example, the system 100 may reduce the number of repeated data entries that the user may otherwise need to make. While system 100 is discussed throughout with respect to a CRM system, it should be apparent that the system 100, especially including the context control system and the context control interface 102, may be utilized in other types of systems.

As just referenced, the context control interface 102 may display information regarding, and organized with respect to, a working context across multiple applications being used by a user. For example, the context control interface 102 may display information for a selected context and/or may be used to set the attributes and attribute values for the selected context of a user 104. In an example implementation, the context control interface 102 may be callable from a homepage that is personalized to the user 104, or may be otherwise accessible using the system 100. The context control interface 102 is discussed in greater detail below in association with FIG. 2, and in accordance with various example implementations.

The user 104 may represent, for example, a user of the context control interface 102 in various applications 105. For example, the user 104 may be a marketing representative who may use the context control interface 102 to view or manage his or her marketing campaigns, including potential future campaigns. In other example implementations, the user 104 may be a key account manager who may use the context control interface 102 to view or manage the key customer accounts so that the user 104 may focus exclusively on these key accounts.

The context control interface 102 may be associated with, and/or provided by, a context control system 106. The context control system 106 may be configured to define and manage various working context information and other information useful to the user 104, in a way that is easily accessible by, and useful to, the user 104. For example, the context control system 106, perhaps in conjunction with other CRM components, may be used to coordinate the population of various fields in an application with the information from the context control interface 102. The context control system 106 may be used to customize the system 100 for a particular user 104 such that the user 104 may be able to work in just specific working contexts. The context control system 106 also may be used to pull information that is first entered into an application 105 by the user 104 and to use that information to populate the context control interface 102 and to define a working context based on the information first entered into the application 105. The context control system 106 may then use the newly defined working context to populate fields in a different application, thus enabling the user to continue to work in the same context as the first application in which the information was first entered without having to reenter the same information.

The context control system 106 may allow the user 104 to sort, filter, prioritize and/or categorize various working contexts using the context control interface 102. For example, a key account manager may filter through the customer accounts to view just the customer accounts that have been designated as key accounts. The key account manager may use the context control system 106 to search information related to just the key accounts and/or to view upcoming marketing campaigns related to just the key accounts. Examples of the context control system 106 are discussed in greater detail below in association with FIG. 2.

The context control system 106 may be part of a customer relationship management (CRM) system, which may include an operational CRM 108. The operational CRM 108 may be used, for example, to automate various business processes, or to otherwise provide automated support of various aspects of customer relationship management. For example, the operational CRM 108 may provide automated support for sales, marketing, and service for a business or businesses through sales process logic 110, marketing process logic 112, and service process logic 114, respectively.

The operational CRM 108 also may include the various business applications 105. For example, the various business applications may include a trade promotion management application, a funds management application, and a claims management application. Each of these applications 105 may include multiple different features and functionality, where many of the features within each of the applications 105 may use and take advantage of the uses of the context control system 106 and the context control interface 102. The various applications 105 and some of their many features are discussed below in more detail with respect to FIGS. 2, 5 and 6.

In more specific examples, the sales process logic 110 may automate and/or provide information about sales and sales force management tasks. For example, sales process logic 110 may automate or provide information about predicting future sales, providing administrative sales support, or maintaining customer-specific information.

Somewhat similarly, the marketing process logic 112 may automate and/or provide information about marketing. For example, the marketing process logic 112 may automate or provide information about current marketing trends, or may support implementation of a current marketing plan. For example, the marketing process logic 112 may conduct surveys, send e-mails or other communications to customers regarding a current marketing plan, or coordinate with marketing service providers to implement a marketing plan therewith. Additionally, the marketing process logic 112 may work in conjunction with applications 105, including a trade promotion management application.

The service process logic 114 may automate and/or provide information about services provided to customers as part of a sale or other interaction with the customers. For example, the service process logic 114 may automate and/or provide information about customer complaints or requests, or may provide technical or other support to customers, or may handle customer exchanges or refunds.

Thus, the operational CRM 108 provides support and assistance for identifying current or potential customers, planning trade promotions for customers, executing sales to the customers, and then providing assistance to the customers in support of the executed sales. In other words, the operational CRM 108 facilitates present and future interactions between an enterprise (including the user 104) and its customers. Consequently, although not specifically or separately illustrated in FIG. 1, the operational CRM 108 may include, or be associated with, collaborative CRM, which may provide and manage a number of different communication techniques (e.g., e-mail, telephone, or other interactions) between the sales or marketing representative or other user 104 and a given customer(s). Thus, such collaborative CRM facilitates interactions, or collaborations, between various associated entities (e.g., between sales representatives and customers, between service providers and customers, and/or between marketing professionals/campaigns and customers)

As appreciated from the above description, the operational CRM 108 thus may be used to establish, maintain, and grow customers over a lifetime of the enterprise. In this regard, the operational CRM 108 may be assisted by other CRM features, e.g., analytics 116, ecommerce 118, and access modes 120.

The analytics 116, for example, may analyze data gathered by the operational CRM 108 (or by components thereof), or relevant data that is otherwise available, in order to improve or enhance customer relationships. For example, the analytics 116 may analyze data gathered by the sales process logic 110 and provide this information to the user 104 (e.g., to identify new customers, increase profitability, or otherwise facilitate the job of the user 104). Similarly, the analytics 116 may analyze data associated with a marketing campaign of the marketing process logic 112. The analytics 116 also may provide support to the service process logic 114, e.g., by analyzing a success rate of a customer call center, or by tracking a number of returns of a sold product.

Ecommerce 118 may provide a way to manage a company's electronic commerce and/or internet interactions. For example, ecommerce 118 may manage the sales process logic 110 when customers purchase merchandise using a website of the enterprise, or using affiliate websites.

The access modes 120 may provide various views of CRM processes depending on which user may be trying to access the system. For example, the access mode 120 may enable one user unrestricted access to the various working contexts that may be accessible through the context control interface 102 when the user 104 is a supervisor, and the access mode 120 may also provide restricted access to the various working contexts such that a more junior person may have access only to particular working contexts based on the user's job function through the context control interface 102.

The operational CRM 108, including the analytics 116, ecommerce 118, and the access modes 120 may all run off of a CRM server 122. The CRM server 122 may provide some or all of the customer relationship management (CRM) system referenced herein to other computing systems over a network. For example, the CRM server 122 may use CRM middleware 124 to provide CRM sales data from a data warehouse 126 to the operational CRM 108 for processing (e.g. by the sales processing logic 110 and/or the sales workbench system 106), and then to the device 128 for display to the user 104.

The CRM middleware 124 may connect software components, devices and/or applications, including distributed applications and back-end or legacy applications. For example, the CRM middleware 124 may connect the CRM server 122 or operational CRM 108 to the data warehouse 126. The CRM middleware 124 may also for example, allow the context control system 106 to interact with the data warehouse 126 through the operational CRM 108. Thus, data entered into the context control interface 102 may be organized and stored in the data warehouse 126 using the context control system 106. Similarly, information stored in the data warehouse 126 may be used to populate the context control interface 102 using the context control system 106. The CRM middleware 124 may implement an appropriate messaging infrastructure, or other integration services or capabilities, as needed.

The data warehouse 126 may represent one or more of a database, memory or other storage device(s) containing information related to the CRM system. For example, the data warehouse 126 may contain customer account information, contact information, sales information, attribute information, customizing information, attribute value information that may be managed by the context control system 106 and manipulated and displayed in the context control interface 102 which may run on the device 128. In another example implementation, the CRM information may be stored in multiple (types of) data warehouses 126, which may communicate with the CRM server 122.

The device 128 may be any device configured to display and/or interact with a CRM system. For example, the device 128 may be a personal digital assistant (PDA), mobile phone, laptop, desktop computer or other device capable of communicating with the CRM server 122 and allowing a user 104 to interact with the context control interface 102 and other interfaces associated with applications 105. In another example embodiment, multiple devices 128 may communicate with the CRM server 122.

The above description provides example implementations of a CRM system. It will be appreciated that many other features and functions may be included in such a CRM system than may be described here in detail. Further, the illustrated CRM system and system components may interact in any known or acceptable manner, e.g., using an underlying application platform. Thus, the various illustrated components may be combined, or may communicate with one another, in any acceptable or desired fashion. For example, the analytics 116, or component(s) thereof, may be considered to be part of (components of) the operational CRM 108, such as when the marketing process logic 112 includes analytics for analyzing a customer response to a previous marketing campaign.

Figure 2:
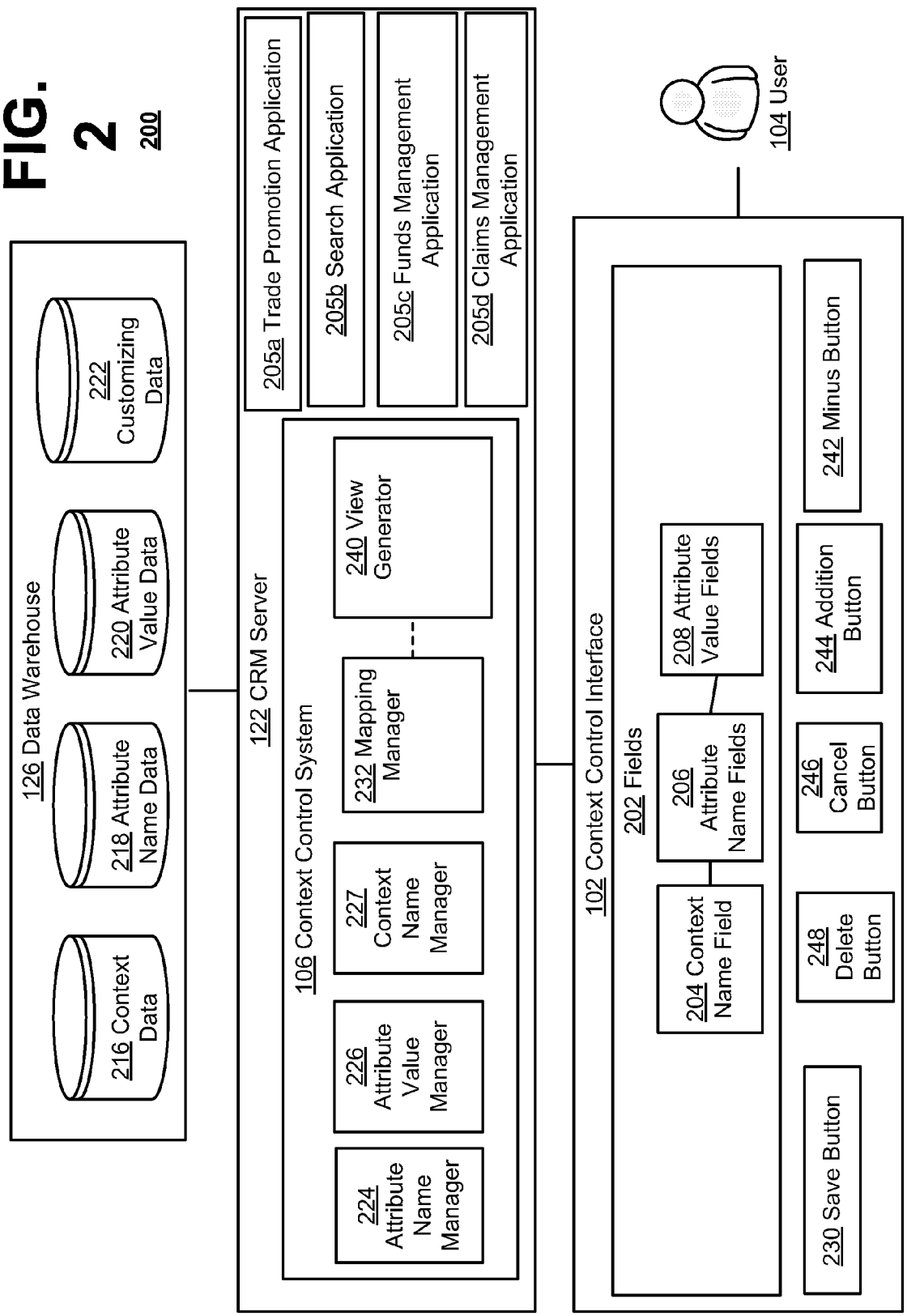
FIG. 2 is a block diagram of an example system for the context control system with context control interface of FIG. 1, including a context control interface of FIG. 1.

FIG. 2 is a block diagram of an example system 200 for the context control system 106 of FIG. 1. The system 200 may include, or provide, the context control interface 102 operated by the user 104. In the following description, the user 104 may also be referred to explicitly as a key account manager 104, although it will be appreciated that other users, as referenced above, may use the context control interface 102 (e.g., a marketing associate).

The user 104, as referenced above, may be a user of a trade promotion application 205a, a search application 205b, a funds management application 205c, and/or a claims management application 205d who has multiple customer accounts for which to manage marketing promotions or to process and manage claims. The user 104 may use the context control interface 102 to set a working context that will apply to each of the different applications 205a-205d. For example, the user 104 may use the context control interface 102 to set attributes and attribute values to work on a particular product promotion for a customer over a particular period of time. In an example implementation, the account manager 104 may have hundreds of customer accounts to manage. The context control interface 102 enables the account manager 104 to enter the attributes and attribute values one time in the context control interface 102 and then those attributes and values are automatically mapped to and populate one or more corresponding fields in the various applications 205a-205d. Thus, the user 104 is able to work on the same customer product promotion for the particular period of time in each of the applications 205a-205d. The user 104 remains in that particular working context even as the user switches focus from one of the applications 205a-205d to another of the applications 205a-205d.

The context control interface 102 facilitates the user 104 creating and saving multiple different working contexts and easily switching between the different working contexts. Thus, for the user 104 who works on promotions for different products for different customers, the user can define and save a working context for each different trade promotion. When the user 104 works on a particular trade promotion, the user 104 simply selects the saved working context for that promotion from the context control interface 102 and the relevant information is populated into the appropriate fields in the different applications 205a-205d as the user navigates from application to application while working within the same specific working context.

In another example implementation, the user 104 may be a junior marketing associate or other sales-associated user who may use system 200 to create and manage customer-related trade promotions. In this example, the context control interface 102 may be customized for that particular junior marketing associate 104 such that the junior marketing associate 104 can only work within a defined set of one or more working contexts. This feature enables a supervisor or other manager to define constraints for the junior marketing associate 104 such that when the associate navigates from application to application they remain within the customized working contexts set by the supervisor or manager.

The context control interface 102 may be an interactive interface that enables a user 104 to create and define working contexts. The context control interface 102 also enables a user 104 to select a previously defined and/or saved working context. The context control interface 102 may be displayed in various forms including a short form and a pop-up window long form and the interface may exhibit various characteristics. For example, the context control interface 102 may be dragable on the display. The context control interface 102 also may be resizable and also can switch between a fixed position on the display and a flexible position that can be moved around by the user 104. The context control interface 102 may display on top of the interfaces for the applications 205a-205d and when hovering on top of those interfaces it may have a translucent quality that enables the user 104 to see both the information in the context control interface 102 and any information on the application interface below the context control interface 102.

The context control interface 102 may include multiple fields 202. For example, the context control interface 102 may include a context name field 204, one or more attribute name fields 206 and one or more attribute value fields 208.

The context name field 204 may be configured to identify a working context. The context name field 204 may be defined by the user 104 when creating a new working context. The context name that is assigned by the user may be saved in the data warehouse 126 in the context data 216. The context data 216 may be associated with the other fields that are populated by the user 104. For example, the user 104 may assign a context name to a particular working context that is meaningful to the user 104 so that when the saved context name is later retrieved, then the user 104 will be reminded of the context by the context name. The context name field 204 may include a selector such as, for example, a drop down selector that provides a list of saved contexts in the context data 216.

In one exemplary implementation, the context control interface 102 may be displayed as a bar placed in one of the tool bar areas for a window. For example, the context control interface 102 may be in a gray bar area at the top of a window and may show just the context name field 204 that identifies the current context name to the user 104. In this implementation, a drop down menu next to the context name field 204 allows the user 104 to see and select from a list of other saved and/or predefined contexts. A selection of one of the contexts from the drop down menu may change the working context from the current context to the selected context and the selected context name will be displayed in the context name field 204. A selection of an edit button in the gray bar area may expand the context control interface 102 to show the other fields and buttons. Alternatively, a selection of an edit button in the gray bar area may instantiate a pop-up window of a full context control interface 102 that displays the other fields and buttons, thus allowing the user 104 to make edits to the context and/or to define and save a new working context.

The attribute name fields 206 may be configured to identify one or more attributes that define the working context. Examples of attributes that may populate the attribute name fields 206 include planning customer, planning period, planning material, product, account, target group, account hierarchy node, trade promotion type, funds plan identifier, start date, and end date. The attribute name fields 206 are customizable and may be defined by the user 104. The different attributes that are viewed in the attribute name fields 206 may be saved and stored in the data warehouse 126 in the attribute name data 218. The attribute name fields 206 may each include a selector such as, for example, a drop down selector that provides a list of saved attribute names in the attribute name data 218.

The attribute value fields 208 may be configured to correspond to the attribute name fields 206 and to define one or more values for the attribute name fields 206. The attribute value fields 208 are customizable and may be defined by the user 104. For example, the user 104 may simply type a desired value for the particular attribute value field 208. The different values that are viewed in the attribute value fields 208 may be saved and stored in the data warehouse 126 in the attribute value data 220.

The context control interface 102 also may include other selectors and/or buttons on the interface. For example, the context control interface 102 may include a save button 230, a cancel button 246, an addition button 244, a minus button 242, and a delete button 248.

The save button 230 allows the user 104 to save a working context so that it may be selected for use at a later time. Selection of the save button 230 may save the displayed attributes and attribute values under the given context name in the context name field. If the particular context is already existing, the existing context may be overwritten with the attributes and values currently being displayed. Selection of the save button 230 also may close a pop-up window of the context control interface and revert the interface to a shortened form, which may just display the working context name in an area of the toolbar.

The cancel button 246 may close the context control interface 102 without saving any changes that may have been made to the attribute name fields 206 and/or the attribute value fields 208.

The addition button 244 may be configured to allow the user 104 to add additional attribute name fields 206 and attribute value fields 208. Whereas the minus button 242 may be configured to allow the user 104 to delete one or more attribute name fields 206 and attribute value fields 208.

The delete button 248 may be configured to allow the user 104 to delete a working context that may not be needed anymore. If the delete button 248 is selected and the current working context is deleted, then the next saved working context in the list may become the active working context.

The user 104 may define a particular working context as narrow or as broad as may be desired. For example, the user may define a working context in a narrow manner by using many attribute name fields 206 and many attribute value fields 208. The more attribute name fields 206 and attribute value fields 208 that are used, then the working context may be more narrowly defined. These selected attribute name fields 206 and corresponding attribute value fields 208 may then be mapped to specific fields in the applications 205a-205d and may populate those fields. Thus, results in the applications applying the working context may be more narrowly focused. Alternatively, for example, the user 104 may define a working context in a broad manner by using fewer attribute name fields 206 and attribute value fields 208. The fewer attribute name fields 206 and attribute value fields 208 that are used, then the working context may be more broadly defined. Thus, results in the applications 205a-205d applying the working context may be more broadly focused and include a broader, more encompassing results list.

In an exemplary implementation, the context control interface 102 may interact with the context control system 106 to manage the fields 202 and various buttons on the context control interface 102. The context control system 106 may interface with the data warehouse 126 and manage the information being communicated between the data warehouse 126 and the context control interface 102. The context control system 106 also may manage the context control information that is being communicated to and from the various different applications 205a-205d.

The CRM server 122, or components thereof, may serve as a communication medium between different systems or devices. For example, the CRM server 122 may retrieve information from the data warehouse 126, provide the information to the context control system 106 (which may be running on the CRM server 122), and associate the context control system 106 with the context control interface 102. In an example embodiment, the CRM server 122 may include software and/or hardware configured to read information from the data warehouse 126 and provide the information to the context control system 106 and the context control interface 102. Also, for example, the CRM server 122 may coordinate the information flow among the applications 205a-205d, the context control system 106, the context control interface 102 and the data warehouse 126.

As described above, the data warehouse 126 may be a database, memory or other storage device containing information related to a CRM system. For example, as discussed above, the data warehouse 126 may include context data 216, attribute name data 218, attribute value data 220 and customizing data 222, where some of the information may be managed by the context control system 106 and displayed in the context control interface 102 and the interfaces for the applications 205a-205d.

The context data 216 may include data and information related to the list of defined and saved working contexts including the name of the working context. The context data 216 may store the context name from the context name field 204 and include the list of contexts when the drop down menu is selected by the user 104. The context data 216 may include information needed to point to the other tables and data in the data warehouse such that when a context name is selected the appropriate data is used to populate the fields 202 in the context control interface 102.

The attribute name data 218 may include information and data related to the attributes that are available for use by the user 104 to populate the attribute name fields 206. The attribute value data 220 may include information and data related to the values that are used to populate the attribute value fields 208.

The customizing data 222 may be data that is related to a particular business or company that is using the system 200. For example, the customizing data 222 may include user profile information and user access control information to control access to working context information based on the user profile, the user's role, or by other criteria. The customizing data 222 may assign working context profiles to different business roles within an organization such that users with different working context profiles may have access to particular working contexts. The context control system 106 may manage the information in the customizing data 222 and use the customizing data 222 to control which working contexts the user 104 may utilize within the context control interface 102. In one implementation, for example, the customizing data 222 may be used to determine which attributes from the attribute name manager 224 may be available to a particular user or group of users.

It will be appreciated that the illustrated structure of the data warehouse 126 is merely a non-limiting example, and that other data organization schemes are contemplated as well. For example, as appreciated from the discussion below, some or all of the context data 216, the attribute name data 218 and/or the attribute value data 220 may be considered to be context data 216, so that the attribute name data 218 and the attribute value data 220 need not be stored as separate elements.

In an exemplary implementation, the information stored in the data warehouse 126, including the context data 216, the attribute name data 218, the attribute value data 220 and the customizing data 222, may be managed and/or presented in the context control interface 102 by the context control system 106. For example, the attribute name manager 224 may manage or access (e.g., read from and write to) the attribute name data 218.

More specifically, the attribute name manager 224 may be configured to access attribute name information from the attribute name data 218 and to populate one or more attribute name fields 206 in the context control interface 102. For example, the attribute name manager 224 may be configured to access the list of possible attributes for selection by the user and to display the list of possible attributes in a drop down menu for one of the attribute name fields 206.

In another exemplary implementation, the attribute name manager 224 may be configured to receive attribute name information from one of the applications 205a-205d that the user 104 is working within and to populate one or more of the attribute name fields 206 with the attribute name information in the context control interface 102. For example, a user may not be working in a defined working context. Instead, the user's actions within one of the applications 205a-205d may be used to dynamically create a working context. Thus, if the user is planning a trade promotion for Customer "A" and product "XYZ" for the year "2007", then the attribute name fields of customer, product and period (or year) may be used by the attribute name manager 224 to populate the attribute name fields 206 in the context control interface 102. Later, when the user switches to a different application, the same attribute name fields will be used in the different application.

The attribute value manager 226 may manage or access (e.g., read from and write to) the attribute value data 220. More specifically, the attribute value manager 226 may be configured to access attribute value information from the attribute value data 220 and to populate one or more of the attribute value fields 208 in the context control interface 102.

In another exemplary implementation, the attribute value manager 226 may be configured to receive attribute value information from one of the applications that the user 104 is working within and to populate one or more of the attribute value fields 208 with the attribute value information in the context control interface 102. As discussed above with respect to the example for the attribute name manager 224, the user's actions within one of the applications 205a-205d may be used to dynamically create a working context. Thus, the values given in the example above "A", "XYZ" and "2007" may be used to populate the attribute value fields 208 corresponding to the attribute name fields 206. The user 104 may then name the context and save the context to the appropriate data in the data warehouse 126 using the context control system 106.

The context name manager 227 may be configured to define a working context that includes one or more attribute name fields 206 and one or more attribute value fields 208. For example, the context name manager 227 may receive the input of the context name in the context name field 204 and then save the needed information for the defined working context in the context data 216.

The mapping manager 232 may be configured to map the attribute name fields 206 and the attribute value fields 208 to sets of fields within the different applications 205a-205d. In this manner, the working context and the information in the context control interface 102 may be used to automatically populate related fields in the applications 205a-205d. This mapping of fields enables the working context to be persistent across the various different applications 205a-205d. For example, the mapping manager may map the attribute name fields 206 and the attribute value fields 208 to a first set of fields for the trade promotion application 205a and to a second set of fields for the search application 205b. Similarly, the mapping manager 232 may map the fields 202 to sets of fields in the funds management application 205c and to the claims management application 205d.

In one exemplary implementation, the mapping manager 232 may be configured to push the attributes and the values from the context control interface 102 and/or the data warehouse 126 to the appropriate fields in the applications 205a-205d. In other exemplary implementations, the applications 205a-205d may utilize the mapping manger 232 to pull the attributes and the values from the context control interface 102 and/or the data warehouse 126 to populate the appropriate corresponding fields in the applications 205a-205d.

The view generator 240 may generate an interface for a customer relationship management (CRM) system. For example, the view generator 240 may generate the context control interface 102, based in part on the information provided by the context control system 106, including one or more of the attribute name manager 224, the attribute value manager 226, the context name manager 227, and/or the mapping manager 232. The view generator 240 also may enable the functionality of the context control interface 102 discussed above, for example, with respect to the interface placement within the display window, its transparent characteristics and its dragable and resizable features.

Figure 3:
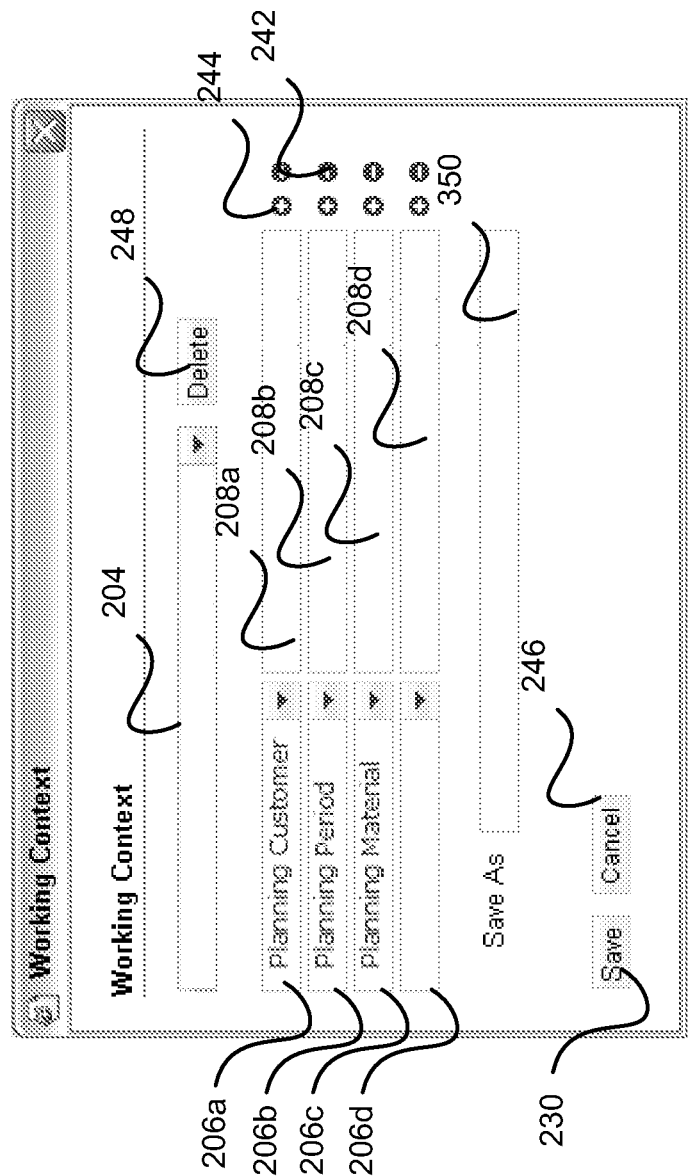
FIG. 3 is an exemplary screenshot of the context control interface of FIGS. 1 and 2.

Referring to FIG. 3, an exemplary screen shot 300 of a context control interface 102 of FIGS. 1 and 2 is illustrated. As described above, the context control interface includes a context name field 204, attribute name fields 206a-206d, and attribute value fields 208a-208d. The context control interface also includes a save button 230, a cancel button 246, a delete button 248, addition buttons 244 and minus buttons 242. The interface also includes a field 350 in which the user 104 can type a name to call a particular working context and that may be saved in the context data 216.

In the example screen shot 300, the attribute name fields 206a-206c are populated with the attributes "Planning Customer", "Planning Period" and "Planning Material", respectively. However, the corresponding attribute value fields 208a-208c are blank. These values for the attribute value fields 208a-208c may be filled in by the user.

Figure 4:
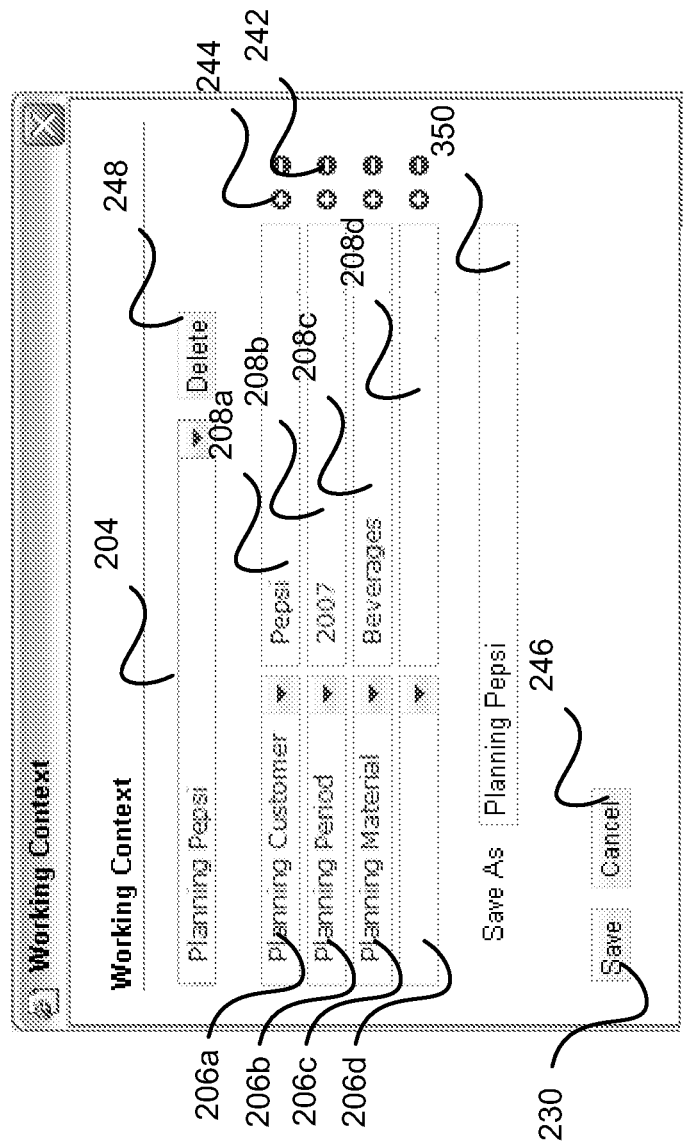
FIG. 4 is an exemplary screenshot of the context control interface of FIGS. 1 and 2.

Referring also to FIG. 4, an exemplary screen shot 400 of the context control interface 102 of FIGS. 1 and 2 is illustrated. In the example screen shot 400, the attribute value fields 208a-208c have been filled in with the values "Pepsi", "2007" and "Beverages", respectively. The values in the attribute value fields 208a-208c correspond to the attribute name fields 206a-206c. The "Save As" field 350 also has been filled in to define a name for this working context and the saved working context name is displayed in the context name field 204 as "Planning Pepsi".

Figure 5:
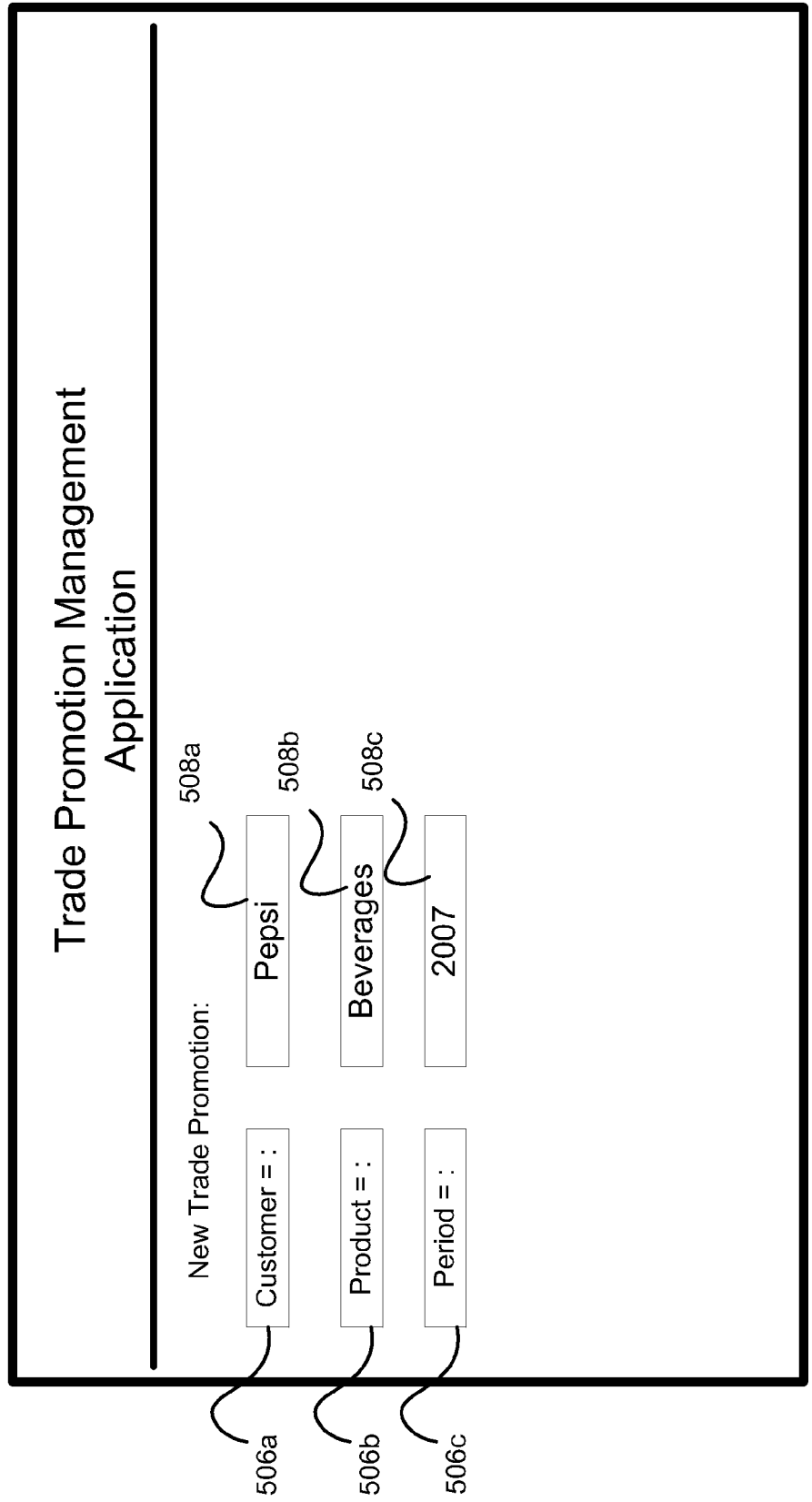
FIG. 5 is an exemplary screenshot of an exemplary application using information from the context control system.
Figure 6:
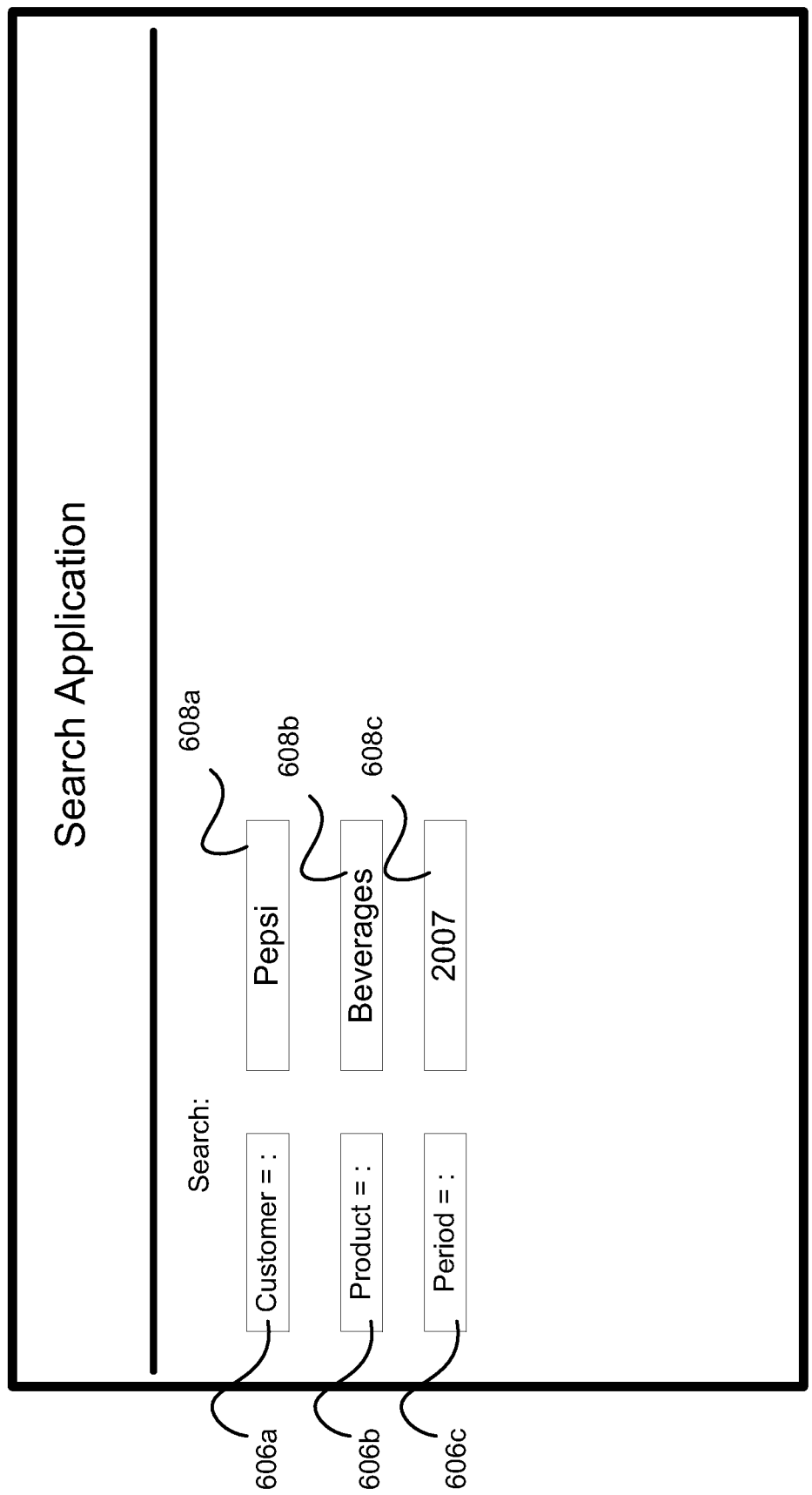
FIG. 6 is an exemplary screenshot of an exemplary application using information from the context control system.

Referring to FIGS. 5 and 6, exemplary screen shots of a trade promotion management application 500 and a search application 600 are illustrated, respectively. The information that has been populated into the context control interface, as shown in FIGS. 3 and 4, is mapped to appropriate fields 506a-506c and 508a-508c in the trade promotion application 500 and to the fields 606a-606c and 608a-608c in the search application 600. These fields in the trade promotion application 500 and the search application 600 are automatically populated without any manual input of the same information by the user. It should be noted that these applications may include other fields particular to the application that the user may enter information.

Figure 7:
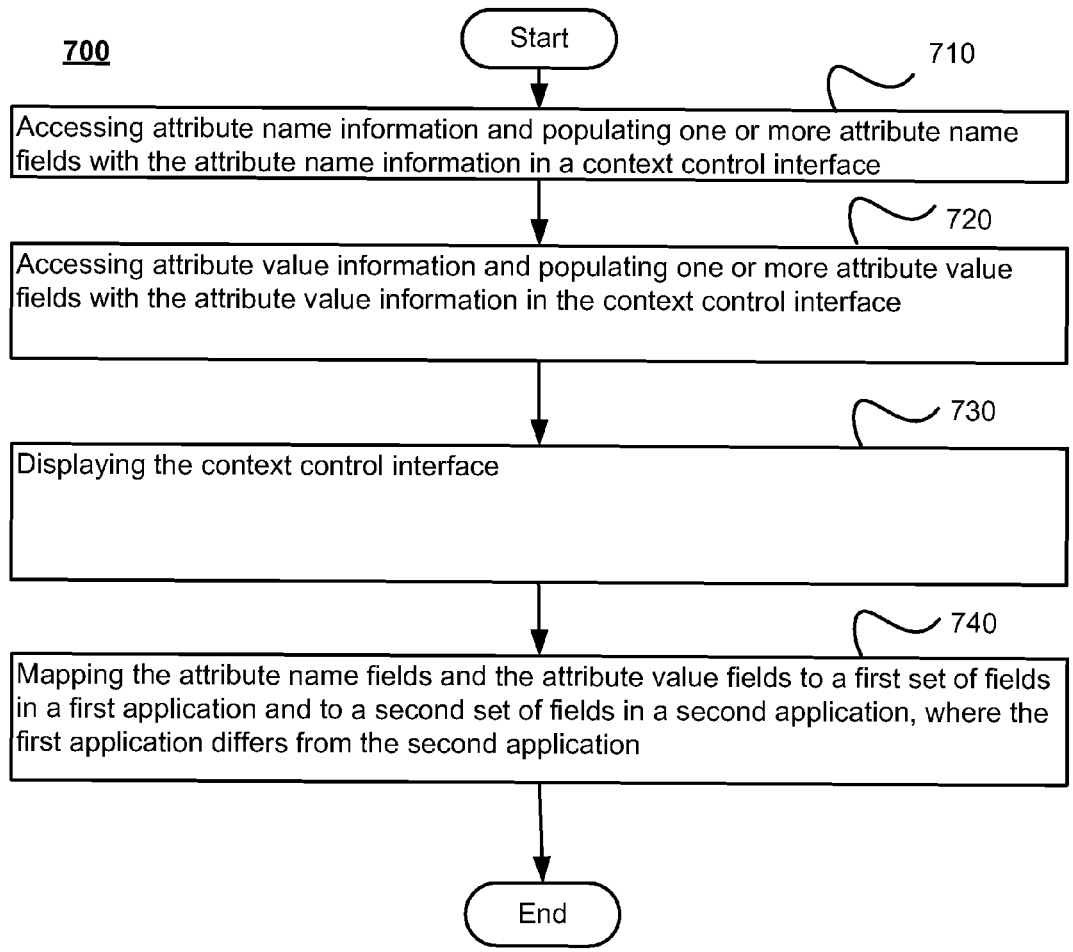
FIG. 7 is a flowchart illustrating example operations of the system of FIGS. 1 and 2.

FIG. 7 is a flowchart 700 illustrating example operations of the system of FIGS. 1 and 2. More specifically, FIG. 7 illustrates an operational flow 700 representing example operations related to providing and implementing the context control system 106.

Flowchart 700 includes accessing attribute name information and populating one or more attribute name fields with the attribute name information in a context control interface (710). For example, the attribute name manager 224 may be configured to access the attribute name information from the attribute name data 218 and populate the attribute name fields 206 with the accessed attribute information (710).

Process 700 includes accessing attribute value information and populating one or more of the attribute value fields with the attribute value information in the context control interface (720). For example, the attribute value manager 226 may be configured to access the attribute value information from the attribute value data 220 and populate the attribute value fields 208 with the accessed value data (720).

The context control interface may be displayed (730). For example, the view generator 240 may display the context control interface 102 (730). Process 700 includes mapping the attribute name fields and the attribute value fields to a first set of fields in a first application and to a second set of fields in a second application, where the first application differs from the second application (740). For example, the mapping manager 232 may map the attribute name fields 206 and the attribute value fields 208 to a first set of fields 506a-506c, 508a-508c in a first application and to a second set of fields 606a-606c, 608a-608c in a second application.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer program product for handling context control information, the computer program product being tangibly embodied on a non-transitory computer-readable medium and including executable code that, when executed, is configured:

to cause at least one data processing apparatus to provide a context control interface, the context control interface having:
a context name input field that is configured to receive a working context name;
one or more attribute name input fields that are configured to receive names of one or more attributes that define the named working context; and
one or more attribute value input fields that are configured to receive one or more values corresponding to the one or more attributes that define the named working context;
to map the received one or more attribute name fields and the corresponding received one or more attribute value fields for the named working context in the context control interface to a first set of fields in a first application and to a second set of fields in a second application; and
to populate the first set of fields and the second set of fields with the received one or more attribute names and the received one or more attribute values from the context control interface such that the named working context is persistent across the first application and the second application, wherein the first application differs from the second application, and wherein the first application and the second application each have an associated display window containing a viewable display of the mapped and populated attribute name fields and attribute value fields, wherein the context control interface is further configured to filter information that is displayed to a user so that only information that matches the attribute name fields and the corresponding attribute value fields for the named working context is displayed across the first and second applications for view and manipulation by the user, and wherein the context control interface is further configurable for a particular user based on one or more of the particular user's job responsibilities, job function, and/or access level so that the particular user is correspondingly constrained to work with only a particular set of information across the first and second applications for view and manipulation, and wherein:
the context name input field includes a first working context name;
the attribute name input fields include a customer field and a period field;
the attribute value input fields includes:
a first attribute value field associated with the customer field and having a first customer name, and
a second attribute value field associated with the period field and having a first time period; and
the first application includes a trade promotion application having a first trade promotion field that is populated with the first customer name and a second trade promotion field that is populated with the first time period such that operations in the trade promotion application take into account the first customer name and the first time period.

2. The computer program product of claim 1 wherein the context name input field includes a list of working contexts such that a selection of one of the working contexts populates the attribute name input fields with attributes for the selected working context and populates the attribute value input fields with values for the selected working context.

3. The computer program product of claim 1 wherein the context name input field includes a listing of working contexts such that a selection of one of the working contexts changes the attribute name input fields to different attribute name input fields defined for the selected working context and populates the different the attribute name input fields with attributes for the selected working context.

4. The computer program product of claim 1 wherein the second application includes a search application having a first search field that is populated with the first customer name and a second search field that is populated with the first time period such that operations in the search application take into account the first customer name and the first time period.

5. The computer program product of claim 1 wherein the context control interface further comprises a save selector that is arranged and configured to save the working context.

6. The computer program product of claim 1 wherein the context control interface further comprises an add selector that is arranged and configured to open additional attribute name input fields and additional attribute value input fields to enable a user to add new attributes and new values to the working context.

7. The computer program product of claim 1 wherein the context control interface further comprises a single movable and resizable window that is arranged and configured to include the context name input field, the attribute name input fields and the attribute value input fields and the window being translucent and on top of a first display for the first application and a second display for the second application.

8. A customer relationship management system including a customer relationship manager server including instructions recorded on a non-transitory computer-readable medium and executable by at least one processor, the server configured to provide a context control system for use by a user, the context control system comprising:

a context name manager that is configured to define a working context that includes one or more attribute name fields and one or more attribute value fields;
an attribute name manager that is configured to access attribute name information and to populate the one or more attribute name fields with the accessed attribute name information in a context control interface;
an attribute value manager that is configured to access attribute value information and to populate the one or more attribute value fields with the accessed attribute value information in the context control interface,
wherein the populated one or more attribute name fields and one or more attribute value fields in the context control interface define a named working context;
a view generator that is arranged and configured to display the context control interface;
a mapping manager that is configured to map the one or more attribute name fields and the one or more attribute value fields populated in the context control interface to a first set of fields in a first application and to a second set of fields in a second application, and populate the first set of fields in the first application and the second set of fields in the second application with the attribute name information and the attribute value information populated in the context control interface, wherein the first application differs from the second application, and the first application and the second application each have an associated display window containing a viewable display of the mapped and populated one or more attribute name fields and the mapped one or more attribute value fields, wherein the context control interface is further configured to filter information that is displayed to a user so that only information that matches the one or more attribute name fields and the corresponding one or more attribute value fields in the named working context is displayed across the first and second applications for view and manipulation by the user, and wherein the context control interface is further configurable for a particular user based on one or more of the particular user's job responsibilities, job function, and/or access level so that the particular user is correspondingly constrained to work with only a particular set of information across the first and second applications for view and manipulation, and wherein:
the first application is a trade promotion application having the first set of fields;
the second application is a search application having the second set of fields: and
the mapping manager is configured to map the one or more attribute name fields and the one or more attribute value fields in the named working context to the first set of fields in the trade promotion application and to map the one or more attribute name fields and the one or more attribute value fields in the named working context to the second set of fields in the search application as a user changes focus from the trade promotion application to the search application.

9. The customer relationship management system of claim 8 wherein the working context is persistent across the first application and the second application.

10. The customer relationship management system of claim 8 wherein the view generator is configured to display the context control interface as a movable and resizable window that is translucent and on top of a first display for the first application and a second display for the second application.

11. The customer relationship management system of claim 8 wherein the mapping manager is configured to push the attribute name information and the attribute value information to the first set of fields in the first application and to the second set of fields in the second application.

12. The customer relationship management system of claim 8, wherein the attribute value manager is further arranged and configured to receive attribute value information entered in the context control interface by a user, the attribute value information corresponding to the attribute name information in the context control interface, the mapping manager being further arranged and configured to populate the attribute value fields mapped to the first application and mapped to the second application with the received attribute value information.

13. A customer relationship management system including a customer relationship manager server including instructions recorded on a non-transitory computer-readable medium and executable by at least one processor, the server configured to provide a context control system for use by a user, the context control system comprising:

an attribute name manager that is arranged and configured to receive attribute name information entered by the user in a first application and to populate one or more attribute name fields in a context control interface with the received attribute name information;

an attribute value manager that is arranged and configured to receive attribute value information entered by the user in the first application and to populate one or more attribute value fields in the context control interface with the received attribute value information;

a context name manager that is configured to define a named working context based on the received attribute name information and the received attribute value information;

a view generator that is arranged and configured to display the context control interface including the received attribute name information and received attribute value information; and a mapping manager that is arranged and configured to map the received attribute name fields and the received attribute value fields in the context control interface to a set of fields in a second application and to populate the set of fields in the second application with the received attribute name information and the received attribute value information entered by the user in the first application via the context control interface, wherein the first application differs from the second application and are each associated with the named working context, wherein the context control interface is further configured to filter information that is displayed to a user so that only information that matches the attribute name fields and the corresponding attribute value fields in the named working context is displayed across the first and second applications for view and manipulation by the user, and wherein the context control interface is further configurable for a particular user based on one or more of the particular user's job responsibilities, job function, and/or access level so that the particular user is correspondingly constrained to work with only a particular set of information across the first and second applications for view and manipulation, and wherein:
the first application is a trade promotion application having the first set of fields:
the second application is a search application having the second set of fields: and
the mapping manager is configured to map the one or more attribute name fields and the one or more attribute value fields in the named working context to the first set of fields in the trade promotion application and to map the one or more attribute name fields and the one or more attribute value fields in the named working context to the second set of fields in the search application as a user changes focus from the trade promotion application to the search application or vice versa.

14. The customer relationship management system of claim 13 wherein the view generator is arranged and configured to display the context control interface as a movable and resizable window that is translucent and on top of a first display for the first application and a second display for the second application.

15. The customer relationship management system of claim 14 wherein the working context is persistent across multiple applications.

16. A method, comprising:
providing a context control interface in a customer relationship management system;
receiving attribute name information entered by a user in a first application running on the customer relationship management system and populating one or more attribute name fields in the context control interface with the received attribute name information;
receiving attribute value information entered by the user in the first application running on the customer relationship management system and populating one or more attribute name value fields in the context control interface with the received attribute name value information;
defining a named working context based on the received attribute name information and the received attribute value information, the named working context including the attribute name information entered by the user in the first application and the attribute value information entered by the user in the first application;
displaying the context control interface including the received attribute name information and received attribute value information; and
mapping the received attribute name fields and the received attribute value fields in the context control interface to a set of fields in a second application and populating the set of fields in the second application with the received attribute name information and the received attribute value information entered by the user in the first application via the context control interface, wherein the first application differs from the second application and are each associated with the named working context and wherein the first application is a trade promotion application having the first set of fields and the second application is a search application having the second set of fields, wherein the mapping includes mapping the one or more attribute name fields and the one or more attribute value fields in the named working context to the first set of fields in the trade promotion application and mapping the one or more attribute name fields and the one or more attribute value fields to the second set of fields in the search application as a user changes focus from the trade promotion application to the search application or vice versa, wherein the context control interface is further configured to filter information that is displayed to a user so that only information that matches the received attribute name fields and the corresponding received attribute value fields for the named working context is displayed across the first and second applications for view and manipulation by the user, and wherein the context control interface is further configurable for a particular user based on one or more of the particular user's job responsibilities, job function, and/or access level so that the particular user is correspondingly constrained to work with only a particular set of information for the named working context across the first and second applications for view and manipulation.

* * * * *